United States Patent
Dölker et al.

(10) Patent No.: US 6,558,489 B2
(45) Date of Patent: May 6, 2003

(54) DEVICE AND METHOD FOR COATING WORKPIECES

(75) Inventors: Gerhard Dölker, Baiersbronn-Obertal (DE); Markus Heintel, Pfalzgrafenweiler (DE); Wolfgang Renz, Freudenstadt (DE)

(73) Assignee: Robert Bürkle GmbH, Freudenstadt (DE)

( * ) Notice: Subject to any disclaimer, the term of this patent is extended or adjusted under 35 U.S.C. 154(b) by 0 days.

(21) Appl. No.: 09/854,290

(22) Filed: May 11, 2001

(65) Prior Publication Data

US 2002/0011209 A1 Jan. 31, 2002

(30) Foreign Application Priority Data

May 12, 2000 (DE) .......................................... 100 23 243

(51) Int. Cl.[7] .............................................. B32B 31/10
(52) U.S. Cl. ...................... 156/64; 156/360; 156/378; 269/266; 269/254 R; 269/310; 29/559
(58) Field of Search .................... 156/64, 297, 299, 156/360, 361, 378, 556, 558; 269/266, 254 R, 310; 29/559; 108/57.2, 105, 106; 100/49; 409/225

(56) References Cited

U.S. PATENT DOCUMENTS

| | | | |
|---|---|---|---|
| 4,200,272 A | | 4/1980 | Godding |
| 4,684,113 A | * | 8/1987 | Douglas et al. ................ 269/21 |
| 5,457,868 A | * | 10/1995 | Blaimschein ................ 29/559 |
| 6,202,275 B1 | * | 3/2001 | Cioletti et al. ........... 29/407.05 |

FOREIGN PATENT DOCUMENTS

| | | |
|---|---|---|
| DE | 469099 | 11/1928 |
| DE | 19539488 A1 | 10/1996 |
| DE | 19718561 A1 | 11/1998 |
| DE | 19755517 C1 | 1/1999 |
| DE | 19836219 A1 | 2/2000 |
| EP | 0979707 A2 | 2/2000 |
| WO | WO 0021717 | 4/2000 |

* cited by examiner

*Primary Examiner*—Richard Crispino
*Assistant Examiner*—George R Koch, III
(74) *Attorney, Agent, or Firm*—Volpe and Koenig, P.C.

(57) ABSTRACT

Actuators for handling furniture parts to be coated are provided. For this purpose, a feeder device is provided which has a plurality of lifting bolts arranged in a grid-like manner and which can travel vertically in a simplified manner thereby that all lifting bolts of a row can be locked by common locking means and that all lifting bolts of a line can be acted upon by common actuating means.

24 Claims, 9 Drawing Sheets

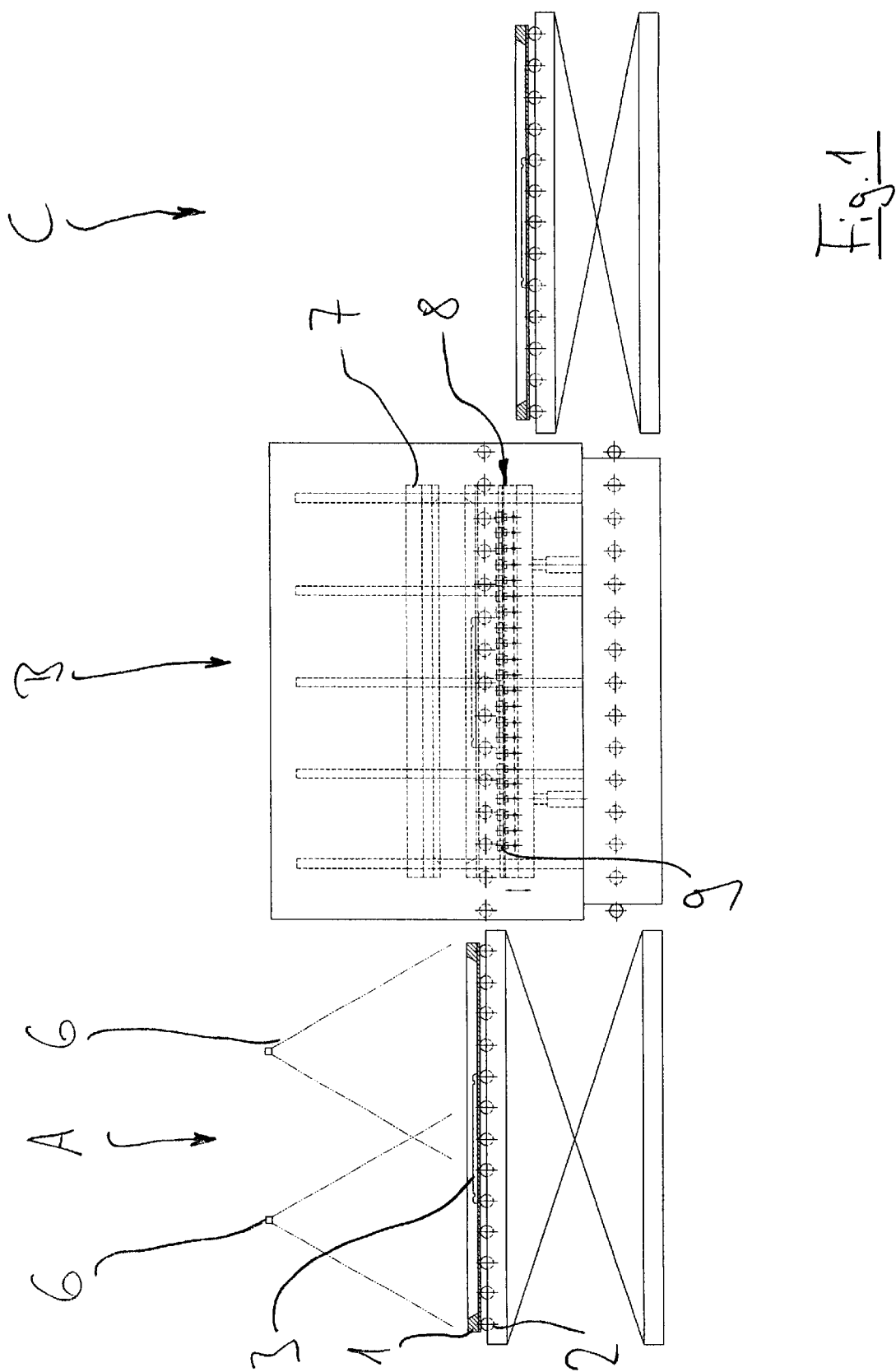

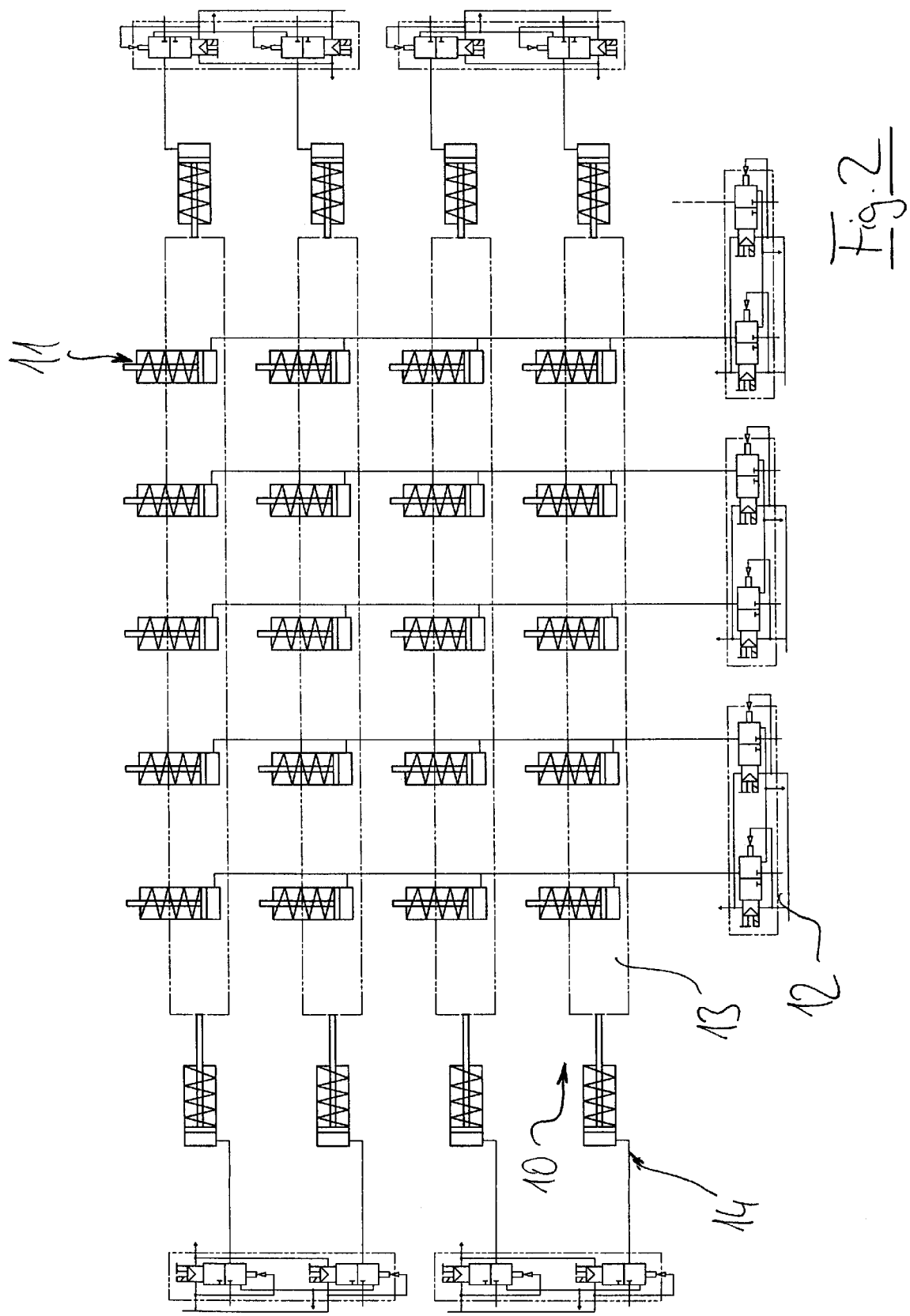

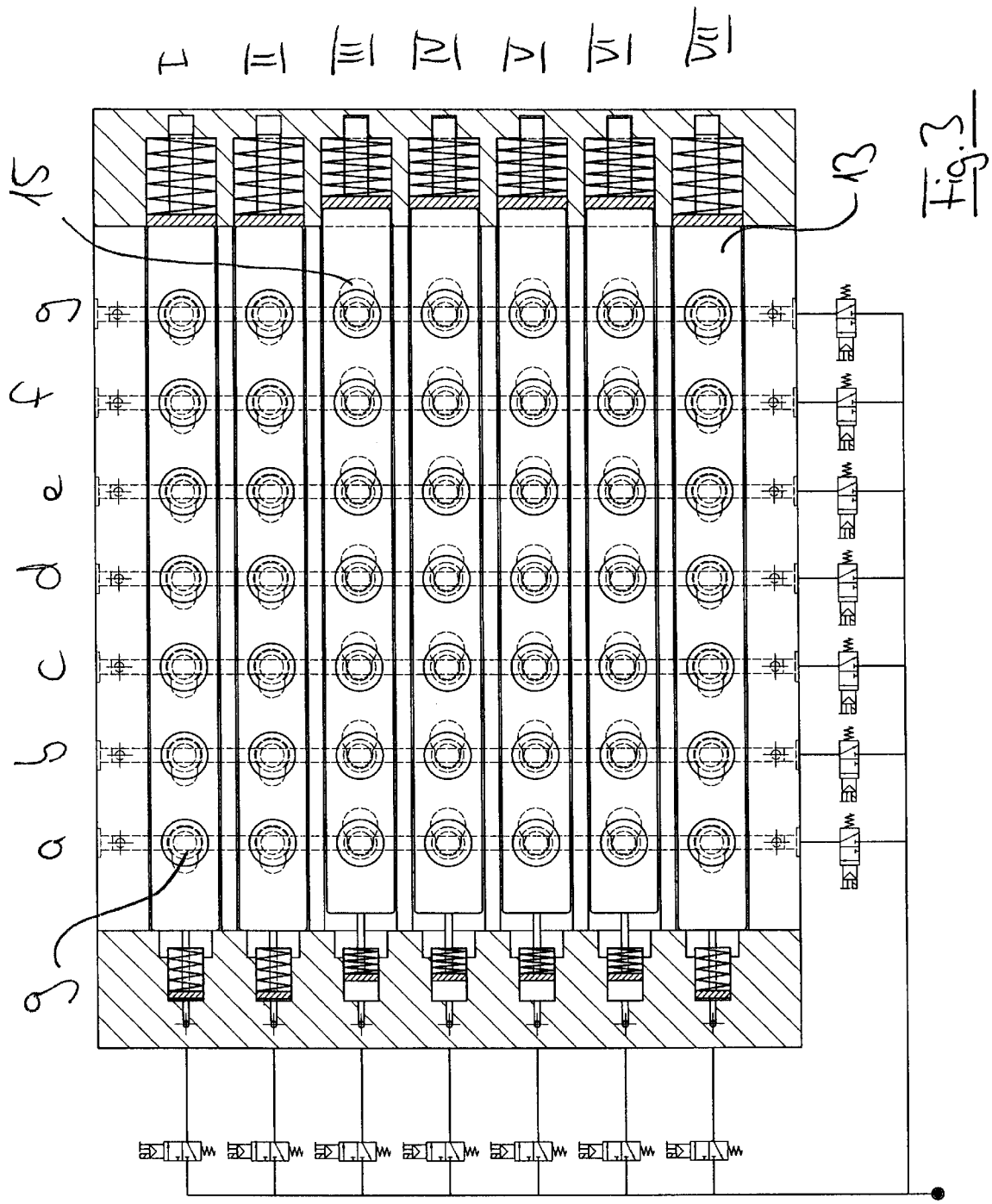

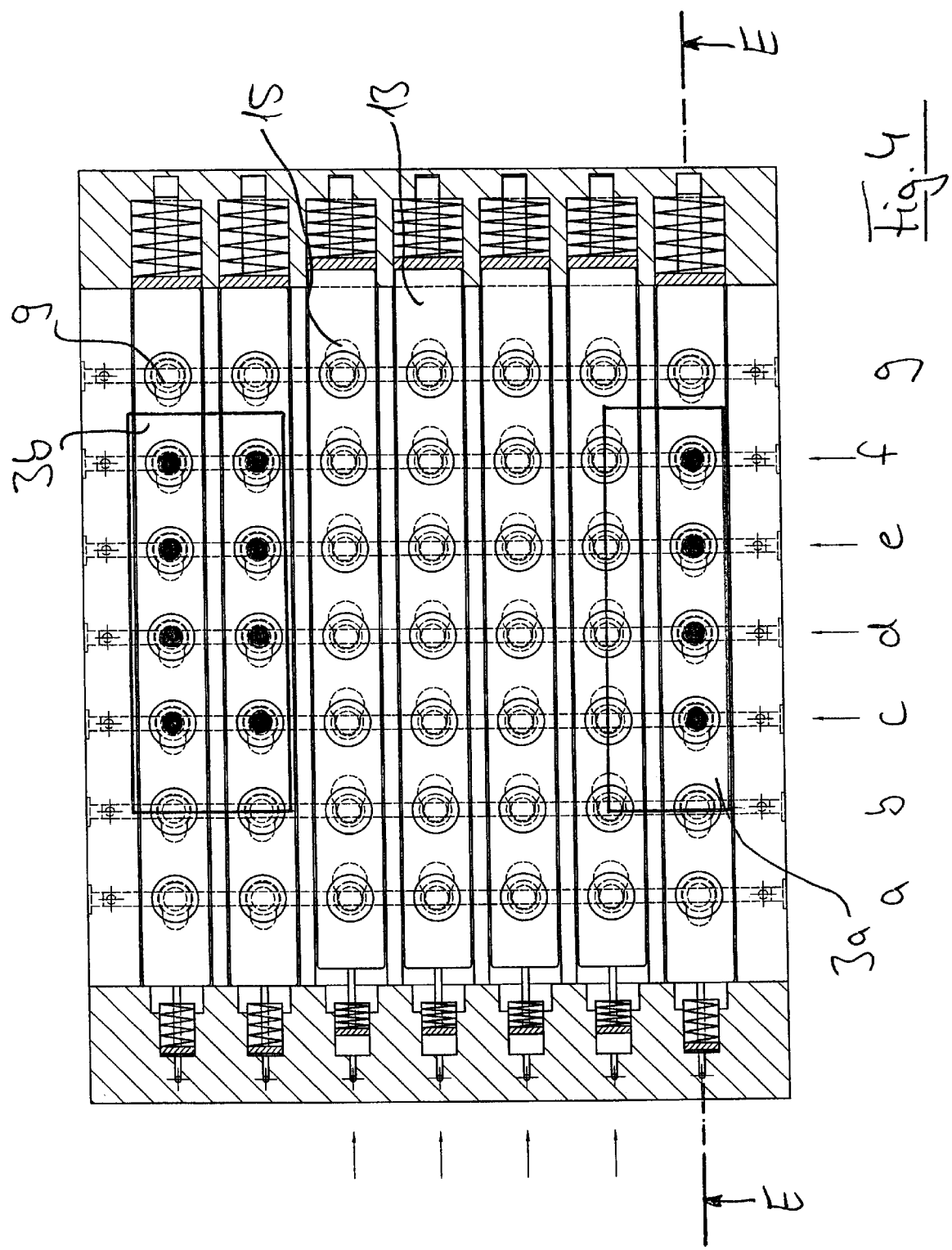

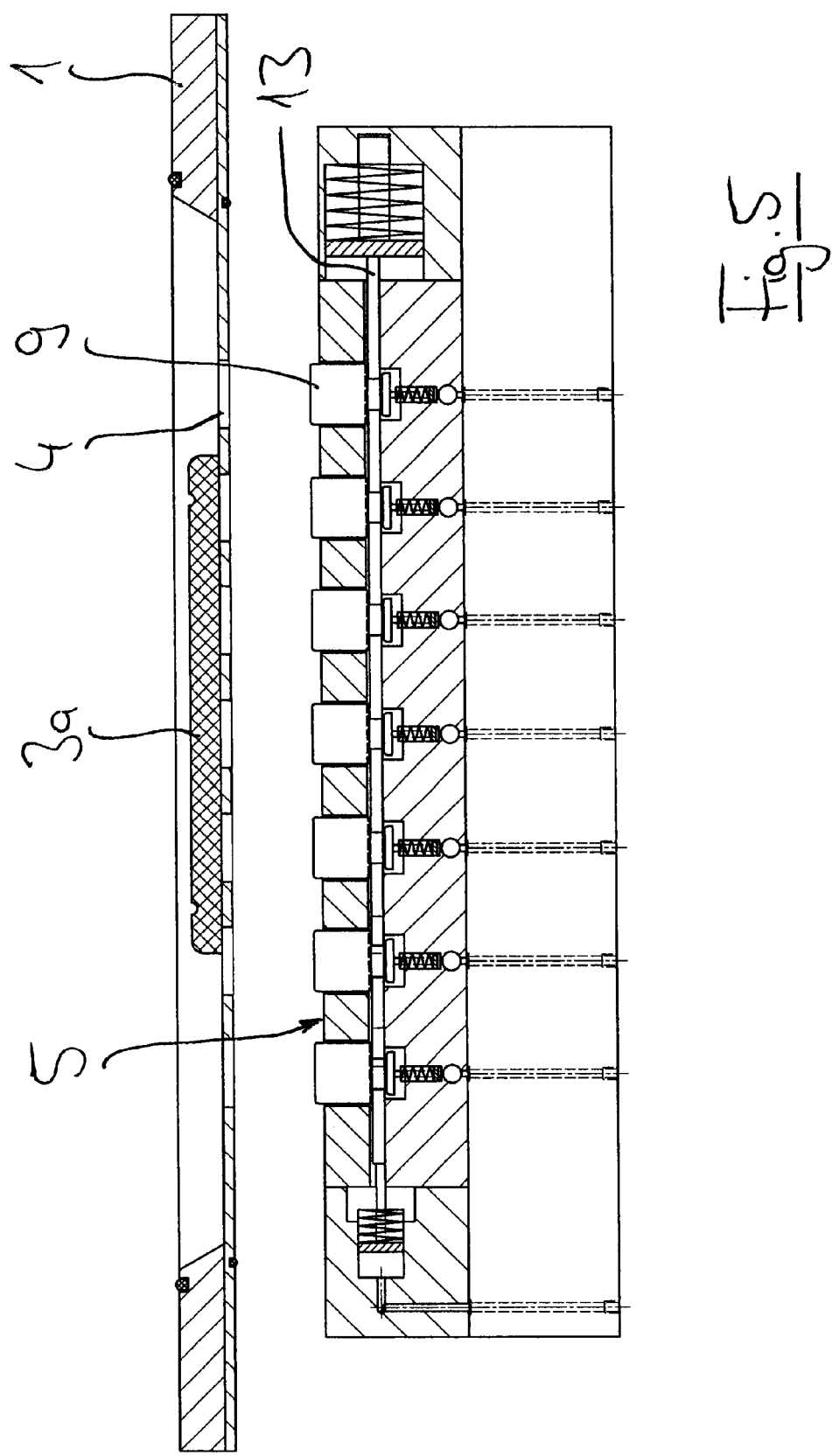

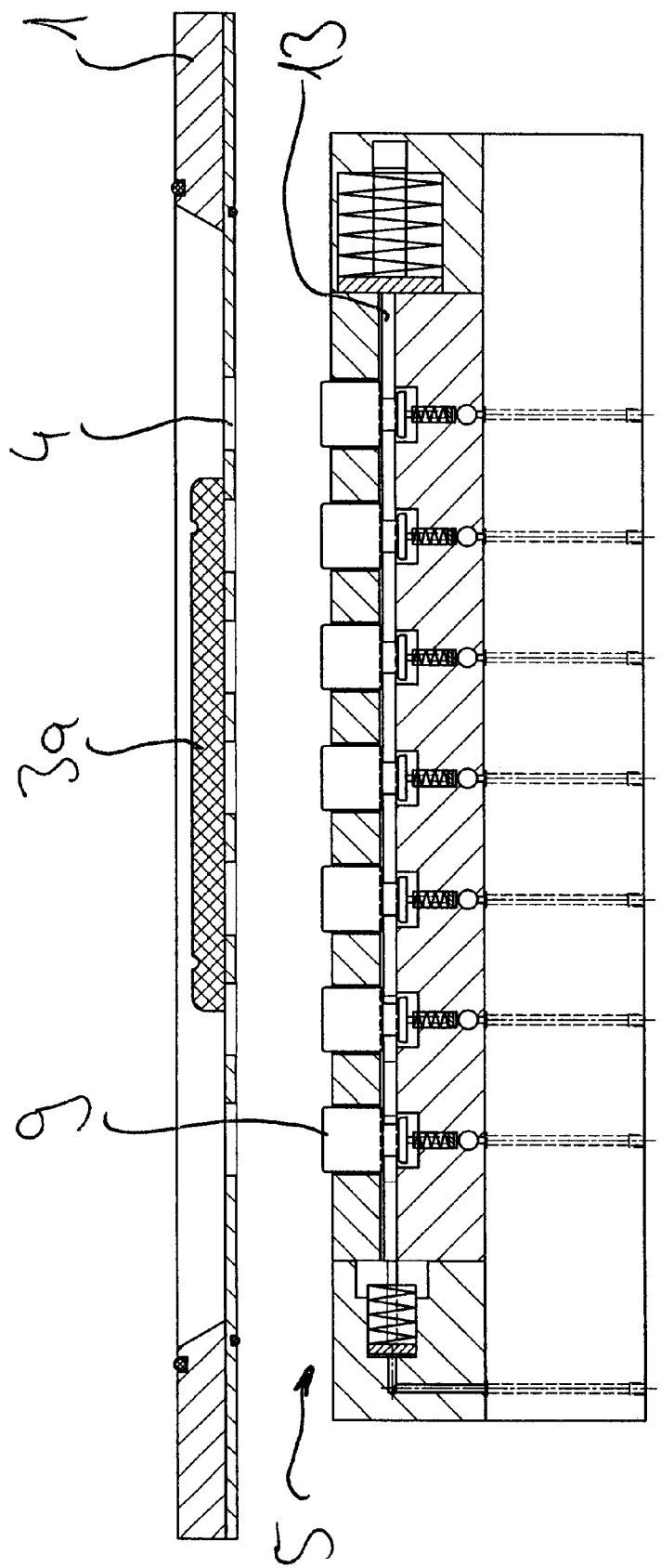

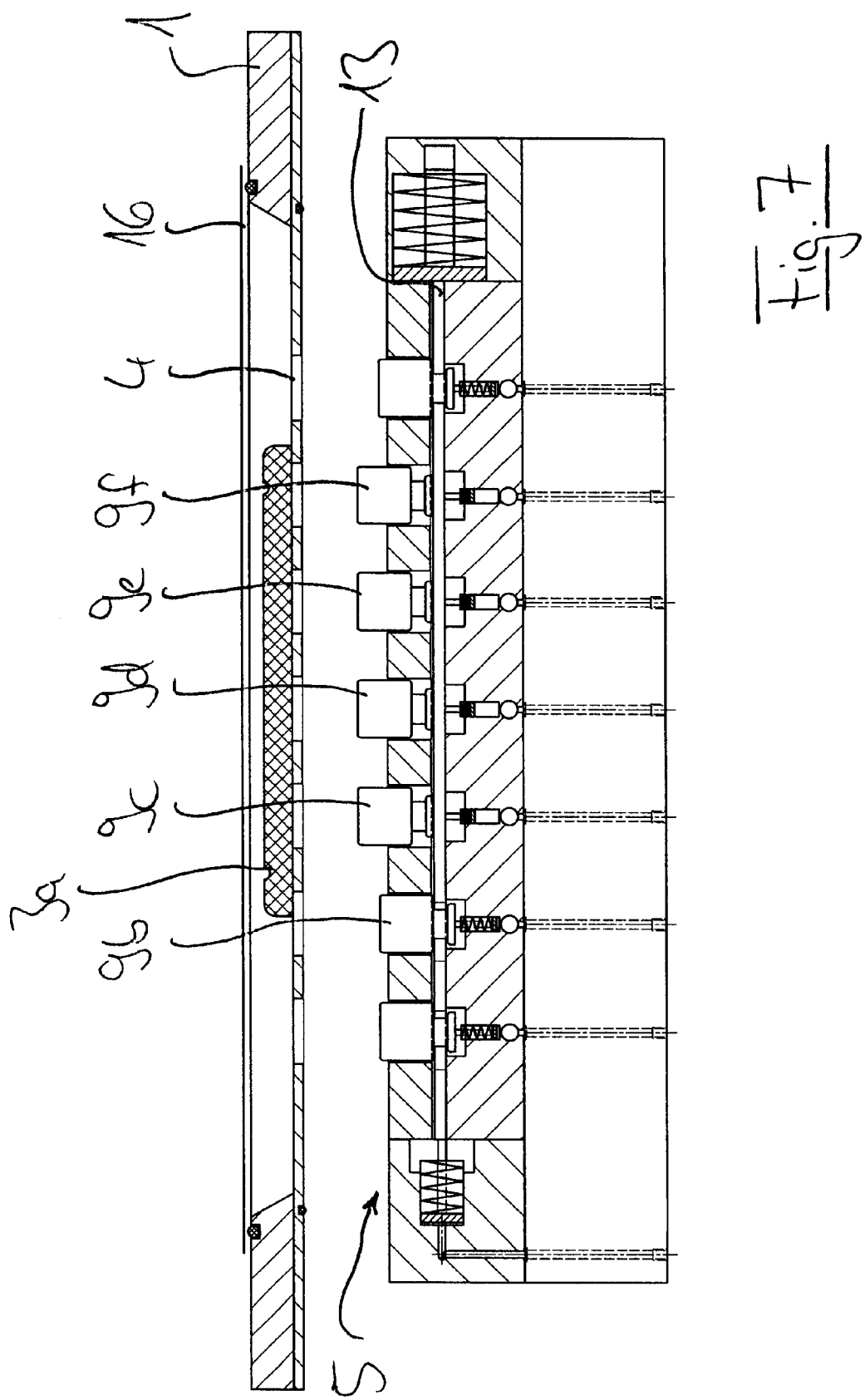

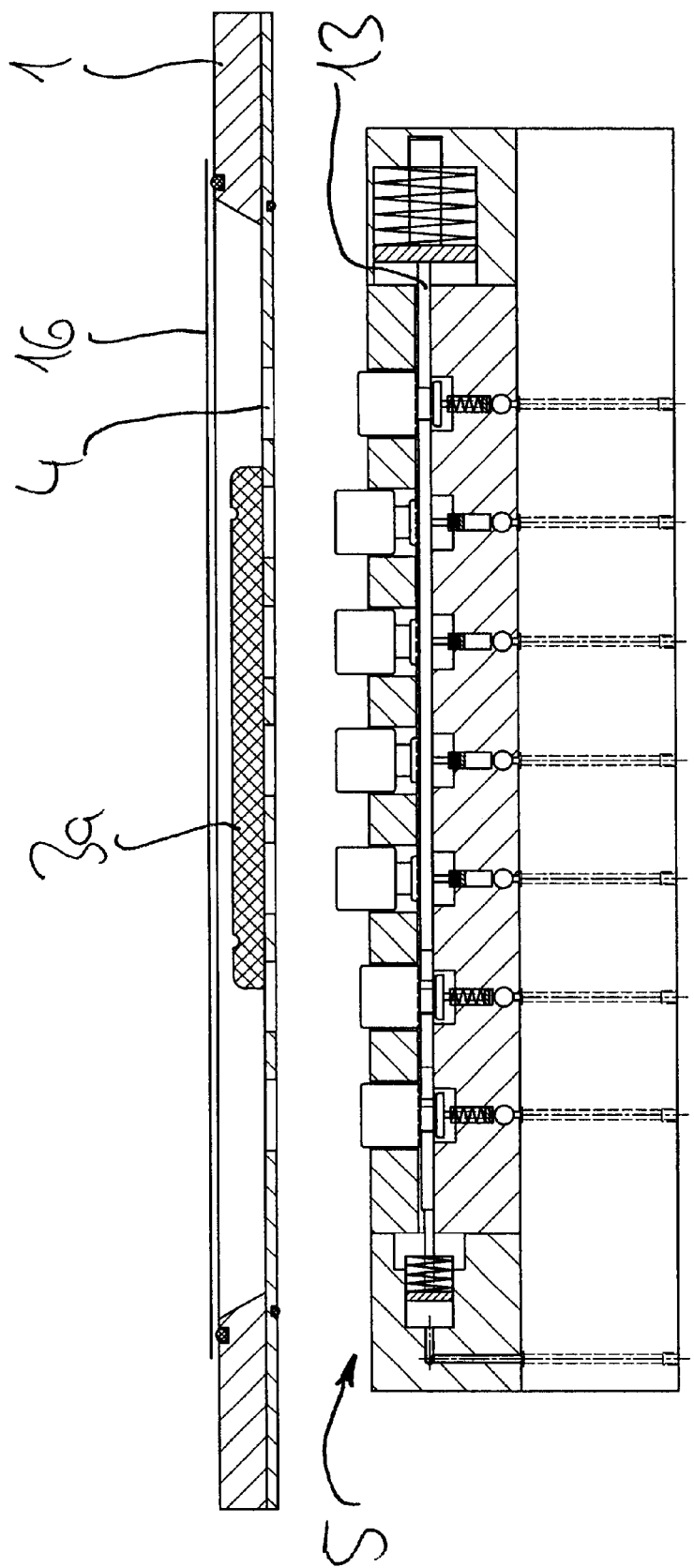

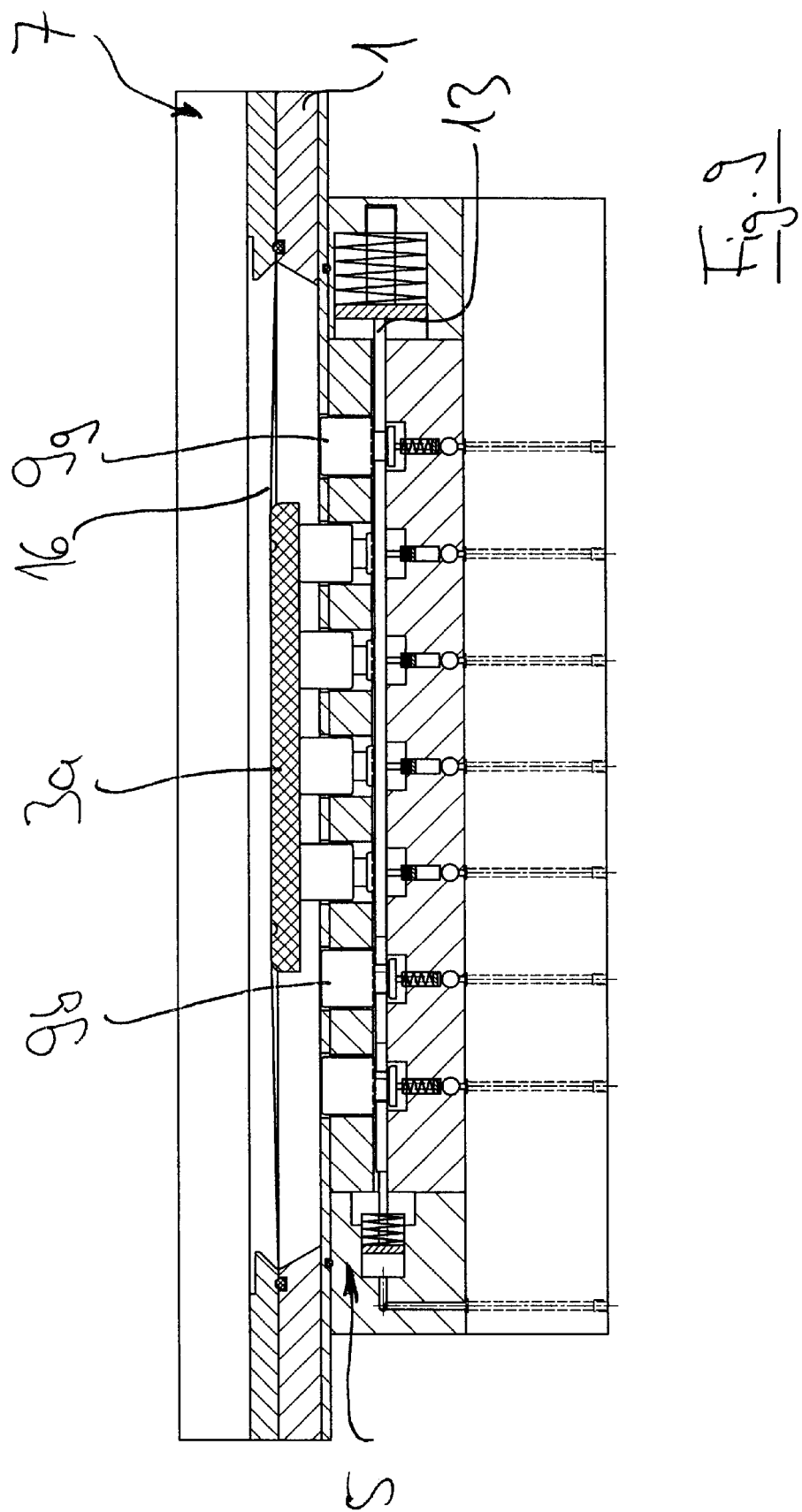

DEVICE AND METHOD FOR COATING WORKPIECES

BACKGROUND

The invention concerns a device for the multi-sided coating of workpieces, in particular panel-like furniture parts, by means of a feeder system comprising a base plate having a plurality of lifting bolts distributed over the base plate in a grid-like manner and which can be adjusted vertically vis-a-vis the base plate between a retracted rest position and an extended coating position, wherein actuating means are provided for the vertical adjustment of the lifting bolts and locking means to lock the individual lifting bolts in the desired vertical position.

Devices of this type are used for furniture parts in which not only the front but also the surrounding side edge surfaces are to be coated with a veneer, a foil material or the like, whereby this coating takes place by heat and pressure in a pressing device. In particular, the workpieces must be lifted by the lifting bolts vis-a-vis the pallet placed on the base plate and supporting said workpieces to enable a trouble-free coating of the edge surfaces. In this case, it is important that only those lifting bolts be raised into the extended coating position which are completely covered by the workpiece while the lifting bolts which are not covered or not completely covered should remain in the rest position in order not to impair the coating process of the edge surfaces.

In the prior art, there are already many descriptions of a feeder system of this type and also the described difficulties, namely to raise and/or not to lower only those lifting bolts which do not impair the coating process of the edge surfaces. In this connection, by way of example, reference is made to EP 0 978 707 from which it is already known, based on all of lifting bolts raised into the coating position, to lock those lifting bolts in the coating position by means of pawls which are completely covered by the workpiece, while the remaining lifting bolts are lowered into the lower rest position by separate adjusting elements. Ultimately, the adjusting elements can be jointly raised or lowered by driving a board carrying the adjusting elements; however, in order to be able to transmit the desired lift position to the lifting bolts, the adjusting elements must first be brought into the lower or upper position by means of separate actuating means for each lifting bolt, depending on the position into which the lifting bolt allocated to the respective adjusting element is to come to lie.

Thus, the known feeder system has its own locking means and also its own actuating means for each lifting bolt, whereby, for further simplification, all actuating means can be driven by a common lifting mechanism.

SUMMARY

Based on the foregoing, the object of the invention is to provide a device of the aforementioned type which enables both the raising or lowering and locking of the lifting bolts in a simplified manner and to thus reduce the operative expenditure of a feeder system. According to the invention, this object is solved therein that the lifting bolts distributed in a grid-like manner are arranged in rows and lines in such a way that each lifting bolt is allocated to a row and a line in each case and that actuating means which can be separately activated and act on all lifting bolts of the line are allocated to each line and that locking means which can be separately activated and act on all lifting bolts of the row are allocated to each row.

This results in the advantage that the device of the invention makes do with one actuating means each per line and one locking means per row and is, nevertheless, able to feed workpieces in such a way that they are only carried by lifting bolts which are completely covered, whereas the lifting bolts not covered or not completely covered remain in the downward driven rest position. It is not necessary to individually actuate every lifting bolt and to provide it with separate actuating and locking means.

In the present invention, the arrangement of the lifting bolts in lines or rows is understood to be a division of the lifting bolt grid into individual groups and the joint actuating of these groups in such a way that each lifting bolt can be locked or released by affiliation with a group and be actuated by simultaneous affiliation with a group and consequently raised or lowered. A simple and clear special case lies therein to dispose every lifting bolt so as to be aligned with the other lifting bolts of its row or its line, whereby the rows and the lines are directed at a right angle to one another. However, other divisions and arrangements of the groups or lifting bolts are also possible. Thus, the rows or columns can also, for example, extend in a zigzag manner, be directed at a specific angle to one another, etc. The expressions "row" or "column" also do not signify any definition with respect to the pattern, shape or direction of the respective group.

While the actuating means advantageously operate pneumatically and as a result enable a problem-free parallel connection of all lifting bolts provided in a line, with respect to the locking means, it is practical if these act mechanically on the lifting means and lock them in the desired vertical position, whereby this locking is usefully accomplished by a blocking element which is positively locked with the lifting bolts. For example, a horizontal bar which travels between a locked position and a release position is suitable as blocking element which acts on all lifting bolts of the same row. A bar of this type can, for example, have keyhole-shaped elongated slots for the respective lifting bolts, so that the aperture range defines the release a way that they are only carried by lifting bolts which are completely covered, whereas the lifting bolts not covered or not completely covered remain in the downward driven rest position. It is not necessary to individually actuate every lifting bolt and to provide it with separate actuating and locking means.

In the present invention, the arrangement of the lifting bolts in lines or rows is understood to be a division of the lifting bolt grid into individual groups and the joint actuating of these groups in such a way that each lifting bolt can be locked or released by affiliation with a group and be actuated by simultaneous affiliation with a group and consequently raised or lowered. A simple and clear special case lies therein to dispose every lifting bolt so as to be aligned with the other lifting bolts of its row or its line, whereby the rows and the lines are directed at a right angle to one another. However, other divisions and arrangements of the groups or lifting bolts are also possible. Thus, the rows or columns can also, for example, extend in a zigzag manner, be directed at a specific angle to one another, etc. The expressions "row" or "column" also do not signify any definition with respect to the pattern, shape or direction of the respective group.

While the actuating means advantageously operate pneumatically and as a result enable a problem-free parallel connection of all lifting bolts provided in a line, with respect to the locking means, it is advantageous if these act mechanically on the lifting means and lock them in the desired vertical position, whereby this locking is usefully accomplished by a blocking element which is positively locked with the lifting bolts. For example, a horizontal bar which travels between a locked position and a release position is suitable as blocking element which acts on all lifting bolts of the same row. A bar of this type can, for example, have keyhole-shaped elongated slots for the respective lifting bolts, so that the aperture range defines the release position with a larger cross section and thus enables a vertical travel of the lifting bolt, while the aperture section with the smaller cross section is used for the positive locking with a corresponding section of the lifting bolt, in order to thus prevent its vertical movement.

The actuation by line and the locking by rows of the lifting bolts according to the invention can be adjusted to one another in such a way that, in the described device, the lifting bolts of a line are each actuated together and the lifting bolts of a row are each locked together. As already noted above, the coating process of the workpieces should not be impaired by the top of bolts protruding laterally vis-a-vis the workpiece; in this case, it is essential that only the lifting bolts completely covered by the workpiece carry the workpiece in the coating position.

Thus, according to the invention, it is provided that the lifting bolts of that row in the rest position are locked in which lifting bolts not covered or not completely covered are found and that, subsequently, the lifting bolts not locked of only those lines are raised from the rest position into the coating position in which these lifting bolts not locked are completely covered by the workpiece. Thus, first of all, the rows of lifting bolts not required are locked, so that the subsequent pneumatic actuation of the required lines of lifting bolts only result in raising those lifting bolts which are not locked. The lifting bolts already locked and then acted upon pneumatically remain in the lower rest position, so that the pneumatic actuation does not ultimately effect the entire lines of lifting bolts but only those lifting bolts of the lines which have not been locked. It can be easily seen that workpieces with various shapes can be stored or coated with this simple procedure.

To finish workpieces that have complex: shapes or workpieces that are to be combined to form a complicated laying pattern, it is advisable to raise the lifting bolts one after the other, row after row. In this case, the lifting bolts of only those lines are actuated for each row in which a lifting bolt to be raised is found in this row and subsequently all lifting bolts of this row are locked in their respective rest position. Moreover, it is advisable that, prior to raising the lifting bolts of a row, to only release the lifting bolts of this row, while the lifting bolts of the other rows remain locked in their respective rest position. This process is continued row after row until all lifting bolts to be raised and which are covered after the workpiece has been placed on them are found in the coating position.

If it is ascertained that the workpieces are positioned in such a way that a number of rows are, simultaneously covered, then the lifting bolts of several rows can be simultaneously released, raised and locked together as the lifting bolts to be raised and arranged in the same row, which means a saving of time when vertically positioning the lifting bolts.

With this method, it does not make any difference whether the workpieces are placed on the lifting bolts before or after the lifting bolts have been raised into the coating position, since neither the actuating or the locking process are dependent on or impaired by a workpiece which has been placed thereon. Admittedly, the second variant of positioning it subsequently offers a substantial advantage therein that the workpiece is only subjected to uniform movements after being placed on it and prior to the coating, without this resulting, in tilting, tipping, etc. On the contrary, when the lifting bolts on which the workpieces have already been placed are raised row by row, the workpiece is not raised parallel, i.e. always in a horizontal position, but successively, i.e. first brought into an inclined position starting at an edge by the lifting bolts there and only then placed into the desired horizontal coating position after almost all lifting bolts have been raised. This can result in uncontrollable tilting motions and, in some circumstances, even to changes in its position.

The preferred procedure is contrary to a part of the prior art in which only the positioned workpiece results therein that lifting bolts which cannot be used travel downward into the rest position. For this purpose, either sensors or pneumatic line sections open in direction of the top of the lifting bolts are provided on the lifting bolts, said line sections identifying the lifting bolts that are not required and triggering their lowering.

According to the present invention, the lifting bolts not required are identified thereby that the workpiece is recorded with respect to its shape, dimensions and position prior to actuating or locking the lifting bolts, for which purpose a scanner is provided which produces a workpiece information about the workpiece data and that the actuating means and the locking means can be activated taking the workpiece information into consideration. It is easiest if the scanner scans the workpiece optically which can, for example, be done laterally, outside of the press prior to the workpiece being conveyed into the press, while the feeder system is preferably situated in the press but it can also be integrated in the pallet.

If a control mechanism is connected to the actuating means and locking means which controls the actuating means and locking means in dependency on the workpiece information, then the raising and lowering of the lifting bolts can actually be obtained in dependency on the shape of the workpiece, even if the workpiece has not as yet been placed on the lifting bolts. For this purpose, the control mechanism only activates those actuating means in whose line at least one lifting bolt is found which is completely covered by a workpiece subsequently placed on it, whereby, prior to activating the actuating means, the control mechanism only steers the locking means in the sense of locking the lifting bolts in whose row lifting bolts are found which are incompletely covered or nor covered by the workpiece.

Instead of using a scanning device to take the workpiece data into account, it is also possible that the control mechanism gives a specific positioning pattern to be adapted to the workpiece to be coated from an optimization program and actuates the lifting bolts or their actuating and locking means according to this positioning pattern. Workpieces can then be placed on the raised lifting bolts either automatically or by an attendant. This procedure is recommended especially for large series, whereby the lifting bolts can also advantageously remain in their respective vertical position for several coating cycles with constant positioning pattern. As a result, the cycle frequency of the coating processes can be increased and the wear and tear on the feeder system reduced.

Moreover, according to the present invention, an overall procedural sequence proposed for processing workpieces, in particular for handling panel-like furniture parts to be coated, which comprises the following procedural steps:

a) scanning the workpiece to be finished with respect to its shape and/or dimensions, b) producing a workpiece information from the scanned data, c) steering a feeder system having a plurality of grid-like lifting bolts arranged in rows and lines and used to position workpieces before and/or after their processing with aid of workpiece information in such a way that the lifting bolts completely covered by the workpieces after they have been placed on them are raised by rows by actuating means each acting on all lifting bolts of a line from their lower rest position into their upper coating position, c1) whereby the actuating means of those lines are activated for each row in which a lifting bolt to be raised and found in this row is located and c2) whereby all lifting bolts of this row are subsequently locked in their respective vertical position by common locking means, and c3) whereby procedural step c1) and then procedural step c2) are carried out successively for all further rows in which a lifting bolt to be raised is found, d) placing the workpiece onto the raised lifting bolt and e) coating the workpiece, in particular of the panel-like furniture part.

This sequence is advantageously supplemented thereby that, prior to carrying out procedural step c1) for a row of lifting bolts, only this row is released by the associated common locking means, while the lifting bolts of the remaining rows remain locked by their locking means. In this case, the lifting bolts are only advantageously released or actuated by rows when at least one lifting bolt of this row is completely covered by the workpiece and must be raised. The actuation by lines of the lifting bolts is also carried out when at least one lifting bolt is completely covered by the workpiece. In this case, the other lifting bolts are in rows which have been locked, as a result of which the actuation does not impair these locked lifting bolts.

BRIEF DESCRIPTION OF THE DRAWINGS

Further features and advantages of the present invention can be found in the following description of an embodiment with reference to the drawings, showing:

FIG. 1 is a device according to the invention for coating workpieces in a schematical side view;

FIG. 2 is a feeding device as part of the device from FIG. 1 in a schematic top view;

FIG. 3 is the feeding device of FIG. 2 in a top view after the various rows of lifting bolts have been locked;

FIG. 4 is the feeding device of FIG. 3 after the various lines of lifting bolts have been actuated; and FIGS. 5 to 9 the feeding device in a side view cut along a row of lifting bolts, in various procedural steps.

DETAILED DESCRIPTION OF THE PREFERRED EMBODIMENT(S)

FIG. 1 shows three stations through which a workpiece to be coated passes, namely a support plate A (on the left in FIG. 1), a coating press B (in the center of the illustration in FIG. 1) and a discharge station C (on the right in FIG. 1). There is a pallet 1 in the support plate on a conveying device 2 in the form of a gravity-roller conveyor which carries a workpiece to be coated in the form of a panel-like furniture part 3. A scanning device 6 consisting of two (or more) optical sensors is provided in the upper area of the support plate A, said scanning device recording the shape, dimensions and the position of the workpiece and forwarding this information to a control mechanism (not shown in FIG. 1), which steers the lifting bolts to be described in the following. The coating foil is applied after the scanning process.

Although only one furniture part 3 is shown within the pallet 1 in FIG. 1, however, in fact, attempts are made to place as many furniture parts as possible on a pallet and to simultaneously coat them, whereby these furniture parts must have an appropriate distance from one another to also enable coating of the edge surfaces. After the shape, dimensions and position of the furniture part or furniture parts have now been recorded by the scanning device 6, a positioning pattern is produced from these and compared with the grid of the lifting bolts 9 which are indicated in the press B in FIG. 1. As will be described in greater detail in the following with reference to FIGS. 2–9, the control mechanism ensures that only those lifting bolts 9 are raised on which the workpiece 3 is placed after being conveyed into the press B and which are then completely covered by the workpiece. In particular, these lifting bolts which are only partially covered by the workpiece should not have any contact with the workpiece.

More precisely, the conveying process from the support plate A into the press B takes place via the conveying device 2, i.e. a gravity roller conveyor, which conveys the pallet 1 horizontally into the press and accurately positions it there in such a way that openings 4 made in the pallet 1, whose shape and position correspond to the dimensions and the grid of the lifting bolts, come to lie exactly with their openings above the lifting bolts.

Before the pallet 1 is lowered downward onto a base plate 5 carrying the lifting bolts, in order to place the workpiece 3 on the lifting bolts, only those lifting bolts are extended upward into their coating position which are completely covered by the workpiece. Lowering the pallet 1 onto the base plate 5 carrying the lifting bolts results therein that the lifting bolts protrude through the openings of the pallet and that the workpiece comes into contact with the lifting bolts found in the coating position and is placed on these.

The coating process can then be carried out in a known manner by heat and pressure, if necessary, with a membrane (not shown). After the coating process, the pallet 1 is raised, so that the workpiece comes to lie on the pallet and the conveying device 2 conveys the pallet in horizontal direction from the press into the discharge position, where the workpieces 3 are separated by cutting the foil and removed.

Alternatively, the lower part of the press carrying the base plate can be lowered to enable the retraction and extension of the pallet, whereby the pallet remains at the conveying level after the coating.

FIG. 2 shows a part of the interior of the press B in a schematic top view and shows the coating device for furniture parts formed of the feeder system B of the invention in detail. It can here be seen that the lifting bolts 9 are grouped in rows 10 and lines 11, whereby each of the rows extend parallel to one another and the lines also extend parallel to one another and a right angle is formed between the rows and lines, however, an oblique angle is also possible. To actuate the lifting bolts 9, i.e. to raise or lower them, pneumatic actuating means 12 are provided which each act upon all lifting bolts of a common line; a directed actuation of individual lifting bolts by the pneumatic actuating means is not possible and is, on the other hand, also not necessary with the design of the feeder system 8 according to the invention. All lifting bolts of a row 10 can be locked in the respective position by locking means 13, whereby a locking means 13 can, for example, be formed from a bar better seen in FIG. 3 and which has keyhole-shaped openings 15 for releasing or locking the lifting bolts. The bar 13 is shifted via its own actuating means 14 horizontally between a release and a locking position.

FIG. 3 illustrates a plurality of lifting bolts 9 in a top view which are arranged in rows I to VII and lines a–g. In the configuration of FIG. 3, the locking means 13 of rows III, IV, V and VI travel in the right locking position (relative to FIGS. 3 and 4), in which the openings 15 of a bar having a smaller cross section of the openings act upon the lifting bolts in such a way that they are positively locked in vertical direction and are prevented from a vertical movement. Contrary thereto, the bars of rows I, II and VII are arranged in the left release position in which the openings 15 with an enlarged cross sectional area which surround the lifting bolts 9 extending through them without being positively locked with them and do not prevent their vertical movement.

Consequently, a line-by-line actuation of the rows c, d, e and f according to FIG. 4 can only result in raising the lifting bolts with the coordinates I c, I d, I e, I f, II c to II f and VII c to VII f, while the other lifting bolts of lines c–f are locked in their lower rest position via the bars 13 allocated to them. The raised lifting bolts 9 according to FIG. 4 thus serve to support two workpieces 3a, 3b, as indicated in FIG. 4. It can be seen here that only those lifting bolts 9 are actually raised upward which are completely covered by the work-pieces 3a, 3b, while the lifting bolts only partially covered remain in the lower rest position in order not to hinder the coating of their edge surfaces. By way of example, reference is here made to the lifting bolts of line b which protrude partially vis-a-vis workpiece contour and must thus remain in the lower rest position.

In this connection, it is noted the lifting bolts 9 are actually much more compactly packed than shown in the schematic FIG. 4, so that a stable support or bearing is always ensured.

FIGS. 5–9 now show individual procedural steps when handling the workpiece 3a with reference to a section along the line VII and along a sectional plane E—E. In the first phase in FIG. 5, all of the lifting bolts 9 are in the lower rest position and are held in position there by the bar 13. In this rest position, the lifting bolts protrude only slightly upward vis-a-vis the base plate 5. The pallet 1 with the workpiece 3a is above the lifting bolts, at a distance therefrom.

FIG. 6 shows how the locking means in the form of the bar 13 is shifted by horizontal travel into the release position and releases the positive locking with the lifting bolts. According to the configuration of FIG. 4, the lifting bolts of lines c–f are then pneumatically actuated, as can be seen in FIG. 7, which results therein that the lifting bolts 9c, 9d, 9e and 9f are raised. The lifting bolts 9a, 9b and 9g which were also not locked were not actuated and thus remain in the lower rest position.

According to FIG. 8, the bar 13 again travels into the lock position, positively locks with all of the lifting bolts of its row and thus locks the lifting bolts 9c–9f in the upper coating position. The pneumatic actuation of these lifting bolts can be terminated due to the vertical position now defined.

As per FIG. 9, the pallet 1 together with the workpiece and the coating foil 16 situated thereon is then lowered vertically downward, whereby the lifting bolts sink into the openings 4 provided in the pallet and the lifting bolts 9c–9f found in the coating position protrude through these openings 4, act upon the underside of the workpiece 3a and space it vis-a-vis the pallet driven further downward. This distance is so great that the workpiece is sufficiently free vis-a-vis the plate base. At the same time, the press is closed, whereby the pallet 1 is sealed toward the top and toward the bottom, in order to provide a sufficiently pressure-tight coating chamber for the subsequent coating process.

During the coating, the coating foil 16 is also placed about the vertical edge surfaces of the workpiece 3a and is permanently affixed there. It can be clearly seen in the illustration of FIG. 9 that the lifting bolt 9b found in the lower rest position would impair the coating process of the left vertical edge surface if it had not been raised upward and would protrude laterally vis-a-vis the workpiece 3a and its edge surface. In this case, even a very great pressure would not suffice to coat the edge surfaces up to its lower area.

In summary, the present invention offers the essential advantage that not every single lifting bolt must be actuated, but rather that the lifting bolts can be actuated or locked by rows and by lines. This results in a considerable saving in actuating or locking means and reduces the apparatus-related requirements of the actuating mechanism of the invention.

What is claimed is:

1. Device for coating of workpieces using a feeder system, comprising a base plate (5) having a plurality of lifting bolts (9) distributed in a grid over the base plate and which can be vertically adjusted relative to thee base plate between a retracted rest position and an extended coating position, whereby actuator (12) are provided for vertical adjustment of the lifting bolts and locking devices (13) for fixing individual lifting bolts in a desired vertical position, wherein the lifting bolts in the grid are arranged in rows (10) and lines (11) such that each lifting bolt is allocated to a row and a line, and one of the actuators (12) is allocated to each line, respectively, which can be separately activated and that acts upon all of the lifting bolts of a respective line and one, of the locking devices (13) is allocated to each row, respectively, which can be separately activated and which acts upon all of the lifting bolts of a respective row.

2. Device for coating workpieces according to claim 1, wherein the actuators (12) work pneumatically.

3. Device for coating workpieces according to claim 1, wherein the locking devices (13) act mechanically upon the lifting bolts (9) and lock them in the desired vertical position.

4. Device for coating workpieces according to claim 3, wherein the lifting bolts (9) are locked by the locking devices (13) via a blocking element positively locked with the lifting bolts.

5. Device for coating workpieces according to claim 4, wherein the locking devices (13) each comprise a bar acting upon all of the lifting bolts (9) of a given row of the rows (10) which can travel horizontally between a locking position and a release position.

6. Device for coating workpieces according to claim 1, wherein each lifting bolt (9) is aligned with the other lifting bolts of a respective row or a respective line.

7. Device for coating workpieces according to claim 1, wherein the feeder system (8) with the lifting bolts (9) is situated in a press.

8. Device for coating workpieces according to at least one of the preceding claims, wherein the lifting bolts (9) are integrated in a pallet (1).

9. Device for coating workpieces according to claim 1, wherein a scanning device (6) is provided which scans a shape, dimensions and/or position of the workpiece (3) to be processed and produces a workpiece information data, and the actuator (12) and the locking devices (13) can be activated taking the workpiece information into account.

10. Device for coating workpieces according to claim 9, wherein the scanning device (6) optically scans the workpiece.

11. Device for coating workpieces according to claim 9, wherein the scanning device (6) is situated outside of a press (8) and scans the workpiece (3) before it is conveyed into the press.

12. Device for coating workpieces according to claim 9, wherein a control mechanism is connected to the actuators (12) and the locking devices (13) which controls the actuators and locking devices dependent on the workpiece information.

13. Device for coating workpieces according to claim 12, wherein the control mechanism only activates the actuators (12) in whose line (11) lifting bolts (9) are found which are completely covered by the workpiece.

14. Device for coating workpieces according to claim 12, wherein after activating the actuators (12), the control mechanism activates the locking devices (13) by locking the lifting bolts in whose row (10) lifting bolts (9) are found which are completely covered by the workpiece.

15. Device for coating workpieces according to claim 1, wherein an optimization device is provided that calculates a positioning pattern taking the workpiece information into account which considers shape, dimensions and/or position of the workpiece to be processed and the actuators and the locking devices can be activated taking this positioning pattern into account.

16. A method for coating of workpieces, comprising:
   providing a feeder system comprising a base plate (5) having a plurality of lifting bolts (9) distributed in a grid over the base plate and which can be vertically adjusted relative to the base plate between a retracted rest position and an extended coating position, actuators (12) for vertical adjustment of the lifting bolts, and locking devices (13) for fixing individual lifting bolts in a desired vertical position, wherein the lifting bolts in the grid are arranged in rows (10) and lines (11) such that each lifting bolt is allocated to a row and a line, and one of the actuators (12) is allocated to each line, respectively, which can be separately activated and that acts upon all of the lifting bolts of a respective line and one of the locking devices (13) is allocated to each row, respectively, which can be separately activated and which acts upon all of the lifting bolts of a respective row;
   activating the lifting bolts (9) of a line (a–g) together and locking and/or releasing the lifting bolts of a row (I–VII) together so that the lifting bolts (9) of those rows (III–VI) in which lifting bolts not completely covered by the workpiece (3, 3a, 3b) are found are locked in the rest position, and unlocked lifting bolts of any of the rows (c–f) in which the unlocked lifting bolts are completely covered by the workpiece are then raised from the rest position into the coating position.

17. Method according to claim 16, wherein the lifting bolts (9) are actuated in dependency on the shape, dimensions and position of the workpiece (3) and only those lifting bolts are raised which are completely covered by the workpiece after it has been placed onto the lifting bolts.

18. Method according to claim 16, wherein the workpiece (3) is scanned with respect to its shape, dimensions and/or position prior to raising the lifting bolts (9).

19. Method according to claim 16, wherein the workpiece is not placed on the lifting bolts until the lifting bolts have been raised into the coating position.

20. A method for coating of workpieces, comprising:
   providing a feeder system comprising a base plate (5) having a plurality of lifting bolts (9) distributed in a grid over the base plate and which can be vertically adjusted relative to the base plate between a retracted rest position and an extended coating position, actuators (12) for vertical adjustment of the lifting bolts, and locking devices (13) for fixing individual lifting bolts in a desired vertical position, wherein the lifting bolts in the grid are arranged in rows (10) and lines (11) such that each lifting bolt is allocated to a row and a line, and one of the actuators (12) is allocated to each line, respectively, which can be separately activated and that acts upon all of the lifting bolts of a respective line and one of the locking devices (13) is allocated to each row, respectively, which can be separately activated and which acts upon all of the lifting bolts of a respective row;
   activating the lifting bolts (9) of a line (a–g) together and locking and/or releasing the lifting bolts of a row (I–VII) together so that the lifting bolts (9) are raised row by row in such a way that the lifting bolts of only the lines are actuated in which a lifting bolt to be raised and found in the row is situated and that all lifting bolts of the row are then locked in their respective vertical position.

21. Method according to claim 20, wherein prior to raising the lifting bolts of a row, only the lifting bolts of this row are released in each case, while the lifting bolts of the other rows remain locked.

22. A method for coating of workpieces, comprising:
   providing a feeder system comprising a base plate (5) having a plurality of lifting bolts (9) distributed in a grid over the base plate and which can be vertically adjusted relative to the base plate between a retracted rest position and an extended coating position, actuators (12) for vertical adjustment of the lifting bolts, and locking devices (13) for fixing individual lifting bolts in a desired vertical position, wherein the lifting bolts in the grid are arranged in rows (10) and lines (11) such that each lifting bolt is allocated to a row and a line, and one of the actuators (12) is allocated to each line, respectively, which can be separately activated and that acts upon all of the lifting bolts of a respective line and one of the locking devices (13) is allocated to each row, respectively, which can be separately activated and which acts upon all of the lifting bolts of a respective row;
   activating the lifting bolts (9) of a line (a–g) together and locking and/or releasing the lifting bolts of a row (I–VII) together so that the lifting bolts of several rows are released, raised and locked simultaneously with the lifting bolts to be raised and arranged in the same line.

23. Method for coating workpieces, comprising:
   a) scanning the workpiece (3, 3a, 3b) to be finished with respect to a shape, dimensions and/or position to create scanned data,
   b) producing workpiece information data from the scanned data,
   c) steering a feeder system having a plurality of grid shaped lifting bolts (9) arranged in rows (I–VII) and lines (a–g) and used to place workpieces on before and/or during processing with aid of the workpiece information data in such a way that the lifting bolts (9) completely covered by the workpieces after they have been placed thereon are raised by rows by actuating means each acting on all lifting bolts of a line from a lower rest position into an upper coating position, c1) whereby the actuating means of those lines (c–f) are activated for each row (I) in which a lifting bolt ($9c$–$9f$) to be raised and found in this row is arranged and c2) whereby all lifting bolts ($9c$–$9f$) of this row are subsequently locked in their respective vertical position by common locking means, and c3) whereby procedural step c1) and then procedural step c2) are carried out successively for all further rows (II, VII) in which lifting bolts (9c–9f) to be raised are found, d) placing the workpiece onto the raised lifting bolts, and e) coating the workpiece, in particular the panel-like furniture part.

24. Method for coating workpieces according to claim 23, wherein, prior to carrying out the procedural step (c1) for a row (I), the lifting bolts (9, $9a$–$9g$) of only this row are released by an associated common locking device, while the lifting bolts of the remaining rows (II–VII) remain locked by the associated locking devices.

* * * * *